Nov. 18, 1969 D. H. MONTGOMERY 3,479,650

MEMORY DRIVER MONITORING CIRCUIT

Filed June 30, 1966

INVENTOR.
DONALD H. MONTGOMERY
BY John V. Regan
Attorney

United States Patent Office 3,479,650
Patented Nov. 18, 1969

3,479,650

MEMORY DRIVER MONITORING CIRCUIT

Donald H. Montgomery, Woodbury, N.J., assignor to RCA Corporation, a corporation of Delaware Filed June 30, 1966, Ser. No. 561,994
Int. Cl. G11b *9/00, 5/00, 13/00*
U.S. Cl. 340—173 5 Claims

ABSTRACT OF THE DISCLOSURE

A memory protection circuit comprising failure detector circuits arranged to monitor the data "read" and data "write" drivers coupled to the computer memory. Following each "read" and "write" cycle, the operation of the drivers is sensed and in the event of a failure, the memory address circuits are immediately inhibited until the malfunction is corrected.

This invention relates to data memory systems. More specifically, the present invention relates to operation protection means for data memory systems.

In the data processing use of modern high speed digital computers, the computer memory is required to store and read out information at a high speed in order to keep pace with the operation of other portions of the data processing system. However, such high speed memory operation presents a problem in maintaining the proper operation of the memory "read" and "write" drive circuits to insure that the memory system is not physically damaged and that incorrect data is not introduced as a result of a malfunction in the memory drive system. Accordingly, it is desirable to monitor the operation of the memory drive system and to provide for corrective action immediately upon the occurrence of a failure in the drive system without allowing further operation of the memory system.

An object of the present invention is to provide a data memory monitoring means.

Another object of the present invention is to provide a memory monitoring circuit for continuously detecting for failure of the proper memory operations.

A further object of the present invention is to provide a computer memory system protection circuit for preventing further operation of the memory system immediately upon detection of a failure in the memory drive system.

In accomplishing these and other objects, there has been provided, in accordance with the present invention, a memory protection circuit having a failure detection circuit arranged to continuously monitor the output signals from the computer memory "read" and "write" drive circuits. The monitoring circuit operates to detect a failure in the operation of the drive circuits at the end of each memory operation. Thus, after either a "read" or a "write" operation, the proper further functioning of the drive circuits is monitored by a failure detecting circuit to protect the computer memory system. If a failure in the operation of the drive circuits is detected, the memory address circuit is immediately blocked by the failure detecting circuit to prevent further memory operation until the malfunction is corrected. Upon correction of the defective memory drive circuit, the memory address circuits are returned to an operative state to allow subsequent operation of the memory system.

Figure 1:
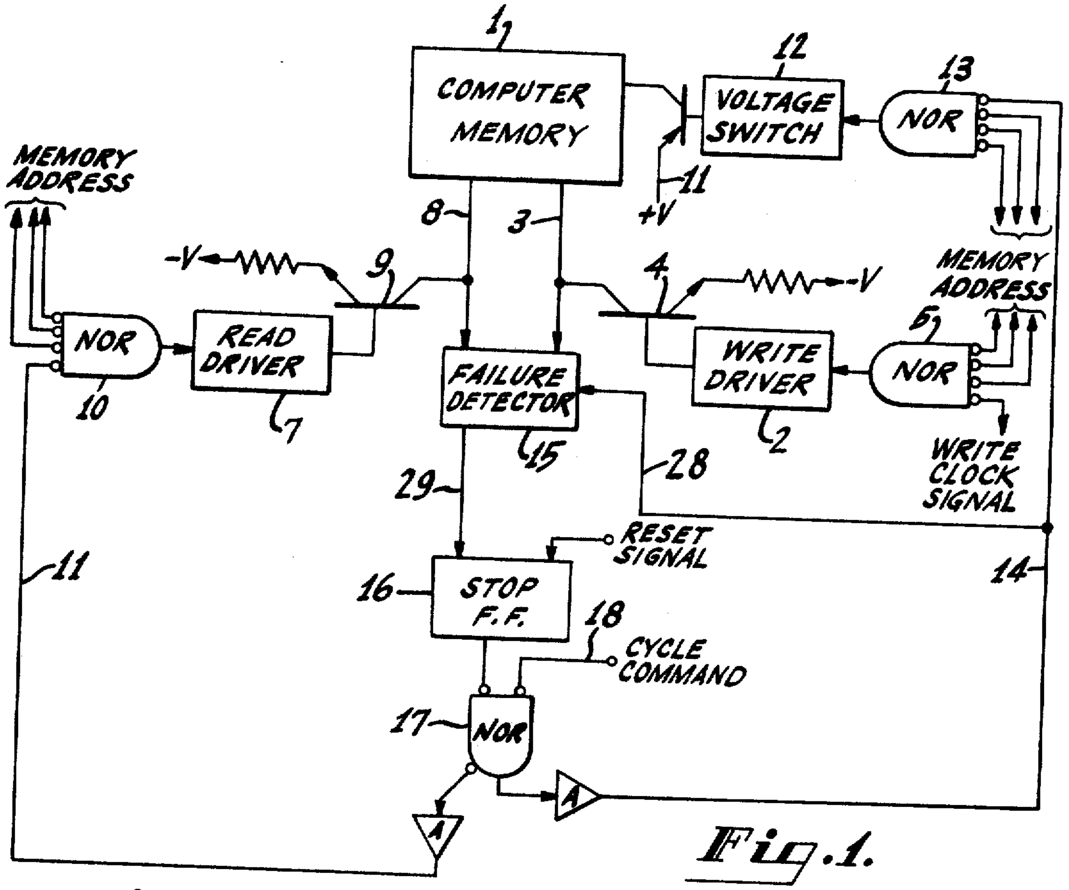
Figure 2:
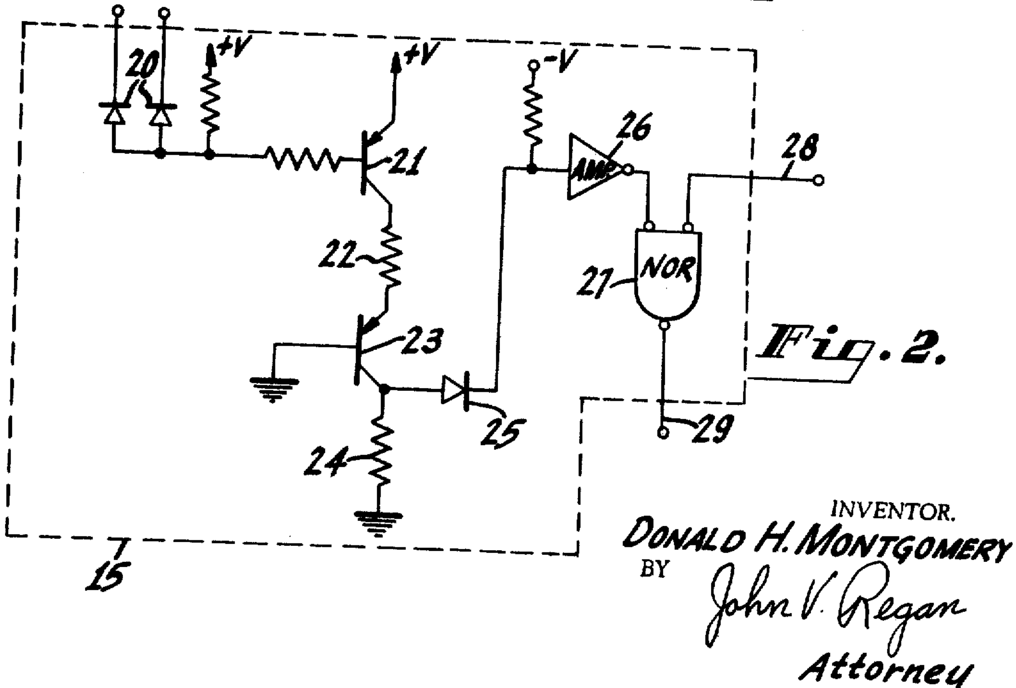

A better understanding of the present invention may be had when the following detailed description is read in connection with the accompanying drawings, in which:

FIGURE 1 is a block diagram of a computer memory protection circuit embodying the present invention; and FIGURE 2 is a schematic illustration of a circuit suitable for use as the failure detectors shown in FIGURE 1.

Referring to FIGURE 1 in more detail, there is shown a memory protection circuit for a computer memory shown in simplified form as a memory block 1. Typically, the memory block 1 may be a so-called coincident current magnetic core memory having transistorized drive circuits. However, it is to be noted that the present invention is applicable to other memory arrangements. A "write" driver circuit 2 is operative to store data in the memory 1 by means of "write" signals applied over a line 3 from a transistor 4 controlled by the driver 2. The "write" driver 2 is controlled by an output signal from a NOR gate 5 which, in turn, is selectively energized by a combination of memory address signals and a "write" clock signal. The NOR gate 5 and the other NOR gates used in the present invention are well-known in the art as shown and described, for example, in Patent 3,213,845 by N. Y. Nieh.

A "read" driver 7 is operative to read stored data from the memory 1 by means of a "read" signal applied over a line 8 from a transistor 9 controlled by the "read" driver 7. A selective energization of the "read" driver 7 is controlled by the output signal from a second NOR gate 10 which, in turn, is controlled by a combination of memory address signals and a read driver clock signal applied on line 11 as hereinafter discussed.

A return path for the "read" and "write" signals from the memory 1 is provided by a transistor 11 which is controlled by a voltage switch means 12. The switch means 12 is selectively actuated by an output signal from a third NOR gate 13 which, in turn, is selected by a combination of memory address signals and a voltage switch clock signal applied from line 14, as hereinafter discussed.

The output signals from both of the drivers 2 and 7 are, also, applied through respective connecting lines to a failure detector 15. A suitable circuit for the detector 15 is shown in FIGURE 2 and described hereinafter. An output signal from the detector 15 is applied to a "stop" flip-flop 16 to set the flip-flop 16 to a predetermined state. Subsequently, an output signal from the flip-flop 16 representative of this predetermined state is applied as one input signal to a fourth NOR gate 17. A second input signal for the NOR gate 17 is obtained from an input line 18 which is arranged to be connected to a source of a cycle command signal generated by the computer to control the memory 1. Two separate output signals from the NOR gate 17 are used to provide the "read" driver clock signal and the voltage switch clock signal, respectively.

In FIGURE 2, there is shown a circuit suitable for use as the failure detector 15 shown in FIGURE 1. The input lines having input diodes 20 are arranged to apply an input signal to the base of a first transistor 21. The diodes 20 are forward biased by a source +V. The emitter of the transistor 21 is connected to a source +V while the collector is connected through a resistor 22 to the emitter of a second transistor 23 having its base connected to ground. The collector of the second transistor 23 is connected to ground through a resistor 24 and through a diode 25 to the input circuit of an inverting amplifier 26. An output signal from the amplifier 26 is applied as one input signal to a NOR gate 27. A second input signal for the NOR gate 27 is arranged to be applied from an inhibit signal line 28. The output signal from the NOR gate 27 is applied to an output line 29. It is to be noted that variations of the embodiment of the present invention shown in FIGURES 1 and 2 may be employed without departing from the scope of the present invention. For example, separate failure detectors may be used for the "read" and "write" drivers to provide an identification means for pinpointing the defective driver. Further, additional "read" and "write" driver circuits may be monitored by the detector 15, either in the illustrated single version or the aforesaid dual variation, by using additional input diodes, such as diodes 20, which would be connected in an expanded "OR" configuration at the input of transistor 21.

In operation, the present invention is arranged to monitor the state of the memory "write" and "read" drive lines 3 and 8 to continuously determine the operating condition of the drivers 2 and 7. The detection of a malfunction represented by a driver remaining "on" after the end of either a "read" or a "write" cycle is effective to trigger the failure detector 15. The output signal from the detector 15 indicative of a driver failure is arranged to set the "stop" flip-flop 16 into a predetermined state, e.g., a "one" state. The high output signal from the "one" state of the flip-flop 16 is, then, applied to the NOR gate 17 to prevent a cycle command signal on line 18 from initiating either a "read" or a "write" operation until the defective driver has been corrected.

In the embodiment of the present invention shown in FIGURE 1, the output signal from the NOR gate 17 is applied, after suitable polarity inversion, to lines 11 and 14 to prevent selection of the "read" driver 7 by the NOR gate 10 and the voltage switch 12 by the NOR gate 13. Thus, the further operation of the memory 1 is prevented until the defective driver circuit has been repaired. A "reset" signal applied to the "zero" side of the stop flip-flop 16 is ineffective to reset the flip-flop 16 to allow a restart of a memory cycle before the repair of defective driver has been effected.

The failure detector 15, as previously mentioned, may be used to indicate which driver is at fault by having a separate failure detector circuit for failure detection of the "read" driver from that used to monitor the "write" driver. The output signal from either one of these detectors would be effective to set the "stop" flip-flop 16.

The detector circuit shown in FIGURE 2 is effective to provide an output signal on line 29 to the "stop" flip-flop 16 when the detector circuit input signal to either of the diodes 20 remains in a "low" voltage state following a "read" or "write" operation. Thus, the memory driver output circuits normally swing between a high voltage and a low voltage state during an "off" and "on" condition, respectively. During the high voltage state of the driver output circuit, the detector circuit input line diodes 20 are turned "off" since this state is at the +V source level reverse biasing the diode 20. In the low voltage state of either input line, the respective diode 20 becomes forward biased and a signal is applied to the transistor 21 to turn it "on." The "on" condition of transistor 21 allows conduction through the emitter-collector path of transistor 21 to produce a current flow through the emitter-collector path of transistor 23. A voltage drop is developed across the collector resistor 24 which is applied, after inversion by amplifier 26, as one input signal to the NOR gate 27. The other input signal to the NOR gate 27, which signal is present during either a "read" or a "write" operation, is obtained from line 14 via connecting line 28. This signal on line 14 is provided by NOR gate 17 and is representative of the presence of both a cycle command signal on line 18 and a non-failure indication signal from the "stop" flip-flop 16, i.e., a "zero" state of the flip-flop 16. Since the cycle command signal on line 18 is terminated at the end of either a "read" or a "write" operation, the inhibit signal on line 28 is, also, removed from the input of the NOR gate 27 in the detector 15. If the input signal to the detector 15 remains "low" indicating a defective driver, the output signal from the NOR gate 27 is switched to a "high" state to set the flip-flop 16 to a "one" state. This state of the flip-flop 16 closes the NOR gate 17 to the cycle command signal and prevents any further memory operation. Further, the "reset" signal to the "stop" flip-flop 16 is ineffective since the output signal from the detector 15 is constantly applied to hold the "one" state of the flip-flop 16. When the driver is restored to normal operation, the output signal from the detector 15 is switched to a "low" signal level which allows the next "reset" signal to reset the "zero" state of the flip-flop 16 and permit further memory operation.

Accordingly, it may be seen that there has been provided, in accordance with the present invention, a memory system protection circuit for immediately preventing further operation of the memory system upon the occurrence of a failure of the memory drive means and returning the memory system to an operative state after the correction of the drive means malfunction.

What is claimed is:

1. A memory protection means for a memory having data "read" and data "write" drive means comprising failure detecting means arranged to monitor the operation of the memory data drive means and to produce a control signal representative of a proper operation of the memory drive means, gate means arranged to provide selective addressing of the memory drive means, and circuit means connecting said control signal to said gate means to allow said addressing of the memory drive means only during proper operation of the memory drive means.

2. A memory protection means as set forth in claim 1, wherein said gate means includes a NOR gate having a plurality of input signals including said control signal from said detecting means.

3. A memory protection means as set forth in claim 1, wherein said failure detecting means includes first means operative to monitor the operation of the memory data "read" drive means, second means operative to monitor the operation of the memory data "wire" drive means and circuit means arranged to produce said control signal in response to either said first or said second means.

4. A memory protection circuit as set forth in claim 1, wherein said failure detecting means includes a plurality of failure detecting circuits corresponding in number to the number of memory data drive means and each of said detecting circuits being operative to produce said control signal.

5. In combination with a computer memory having a read drive circuit to read data stored in the memory and a write drive circuit to write data into the memory, both of which when operating properly, are at a first output voltage level during certain periods and, when not operating properly, are at a second output voltage level during these periods:

failure detection means coupled to both of said drive circuits for producing an output signal indicative of a malfunction in response to the sensing of said second output voltage level during one of said periods;

memory access means coupled to said memory; and means responsive to said output signal for inhibiting said memory access means.

References Cited

UNITED STATES PATENTS

| | | | |
|---|---|---|---|
| 3,196,418 | 7/1965 | Schneberger et al. | 340—174 |
| 2,904,781 | 9/1959 | Katz | 340—146.1 X |
| 3,008,129 | 11/1961 | Katz | 340—146.1 X |
| 3,047,843 | 7/1962 | Katz et al. | 340—174 |
| 3,096,511 | 7/1963 | Taras | 340—174.1 |
| 3,214,601 | 10/1965 | Christopherson | 340—174 X |
| 3,344,417 | 9/1967 | Boyle | 340—174.1 |

STANLEY M. URYNOWICZ, Jr., Primary Examiner

JOSEPH F. BREIMAYER, Assistant Examiner

U.S. Cl. X.R.

340—172.5, 174, 174.1